Figure 1:
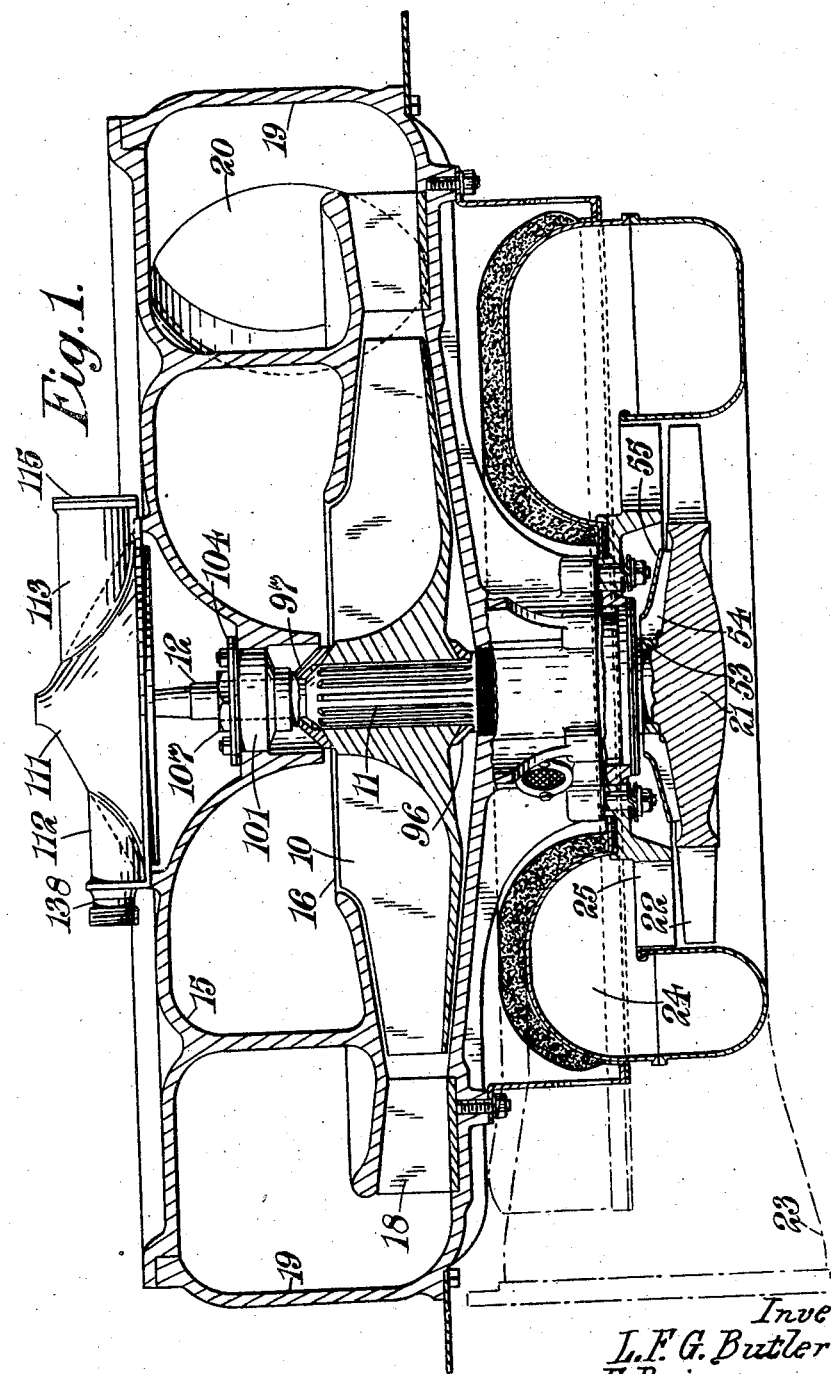

Sept. 22, 1942.   L. F. G. BUTLER   2,296,703
GAS TURBINE
Original Filed Feb. 20, 1940   5 Sheets-Sheet 3

Inventors
L. F. G. Butler
E. Briggs
and E. Bowness
by Wilkinson + Mawhinney
Attorneys.

Sept. 22, 1942.　　　L. F. G. BUTLER　　　2,296,703
GAS TURBINE
Original Filed Feb. 20, 1940　　5 Sheets-Sheet 4

Inventors
L.F.G. Butler
E. Briggs
& E. Bowness
by Wilkinson & Mawkinney
Attorneys.

Sept. 22, 1942.  L. F. G. BUTLER  2,296,703
GAS TURBINE
Original Filed Feb. 20, 1940   5 Sheets-Sheet 5

Inventors
L. F. G. Butler
E. Briggs
E. Bowness
by Wilkinson + Mawhinney
Attorneys.

Patented Sept. 22, 1942

2,296,703

UNITED STATES PATENT OFFICE 2,296,703

GAS TURBINE

Leonard Frederick George Butler, Ernest Briggs, and Edward Bowness, Bristol, England, assignors to The Bristol Aeroplane Company Limited, Bristol, England, a British company Original application February 20, 1940, Serial No. 319,950. Divided and this application September 23, 1941, Serial No. 412,037. In Great Britain January 21, 1939

3 Claims. (Cl. 184—6)

This application corresponds to the application of The Bristol Aeroplane Company Limited, Leonard Frederick George Butler, Ernest Briggs and Edward Bownes, Serial No. 11,453/40, which was filed in Great Britain on July 9, 1940, and dated January 21, 1939 (United States Serial No. 412,036, filed September 23, 1941).

This application is a divisional of our co-pending United States application Serial No. 319,950, filed February 20, 1940, for improvements in "Gas turbines."

This invention is concerned with superchargers for internal-combustion engines and has for its object to provide an improved construction and arrangement of lubricating means therefor. It may be applied to any supercharger and may, for example, be applied to one which is driven by a turbine actuated by the exhaust gases from the engine.

According to this invention there is provided for an internal-combustion engine, the combination of a turbine driven by the exhaust gases of the engine, a blower driven by the turbine, and a pump or pumps also driven by the turbine to supply lubricant to the bearings of the supercharger. When the blower is driven by the exhaust gases, the lubrication requirements of the turbine bearing have no fixed relation to the speed of the internal-combustion engine, and difficulties arise if the lubrication of the turbine bearing is effected from the lubrication system of the engine.

Where the blower comprises a centrifugal fan, the supercharger, according to another feature of this invention, has the turbine-rotor and the impeller of the blower mounted on the same shaft and the pump or pumps are driven through a speed-reducing gear from the said shaft.

According to yet another feature of the invention, the shaft aforesaid is carried in two bearings one adjacent the blower and one adjacent the turbine-rotor, and two pumps are provided each supplying lubricant respectively to one of these bearings.

According to yet another feature of this invention, the said shaft is disposed with its axis substantially vertical with the turbine-rotor at the lower end thereof, and the shaft is engaged near its upper end by a bearing around and above which a cup-shaped chamber is formed into which a metered flow of lubricant is delivered by one of said pumps. Preferably the cup-shaped chamber aforesaid is formed by the outer wall of the inlet chamber of the blower.

The invention also comprises a construction wherein the two lubricating pumps are each of the reciprocating type, the plungers being driven through reduction gearing from the said shaft, and preferably the plungers of the pumps are both driven by a swash-plate or face-cam carried by a shaft which is driven through epicyclic gearing which is driven by a shaft disposed at right-angles to the turbine shaft and driven through worm gearing therefrom.

According to yet another feature of this invention, an anti-friction bearing for the turbine shaft in close proximity to the turbine-rotor is provided with a chamber between it and the inner race of the bearing and one of the lubricating pumps provides a flow of lubricant, through said chamber to cool it.

Figure 2:
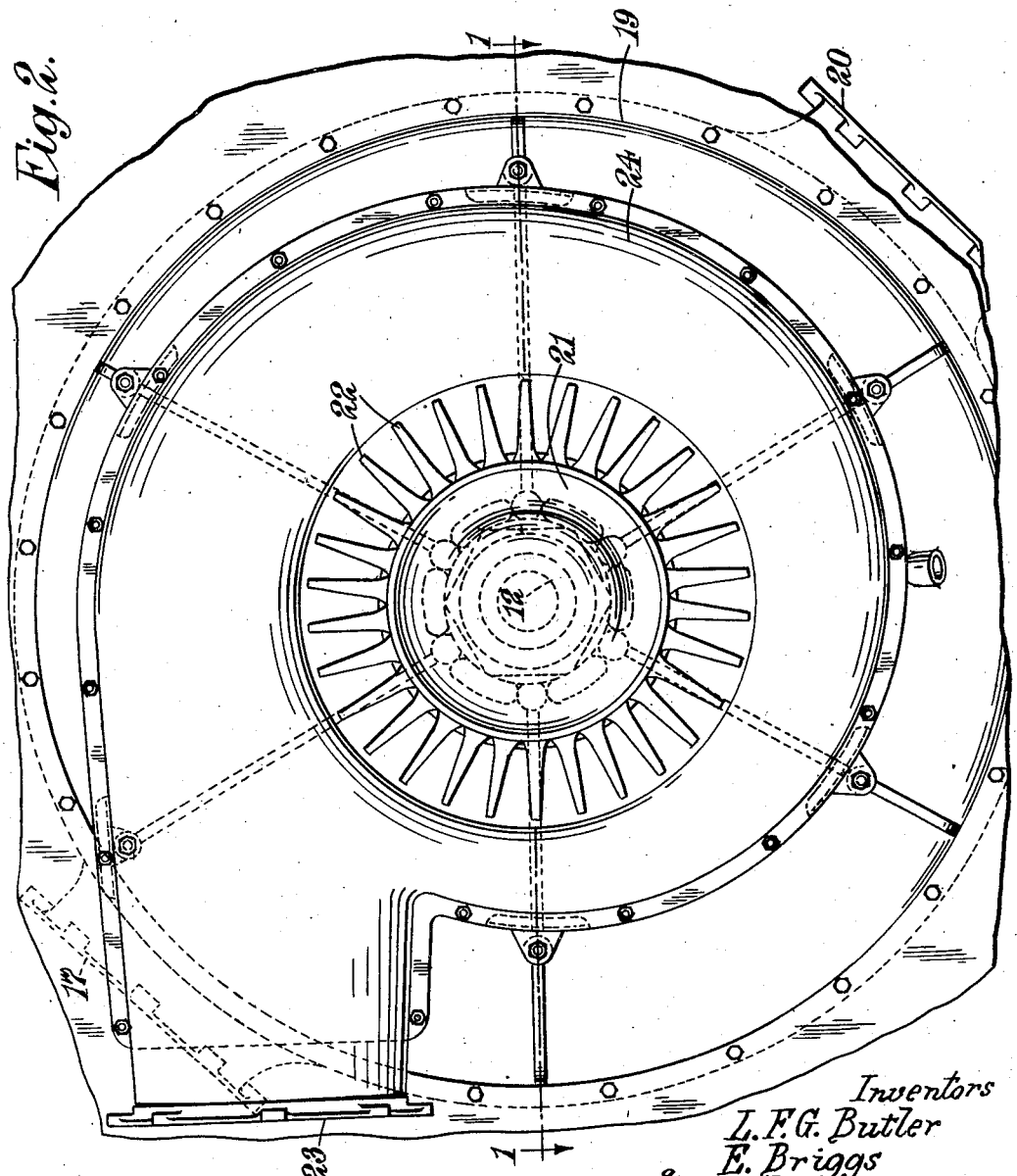
Figure 3:
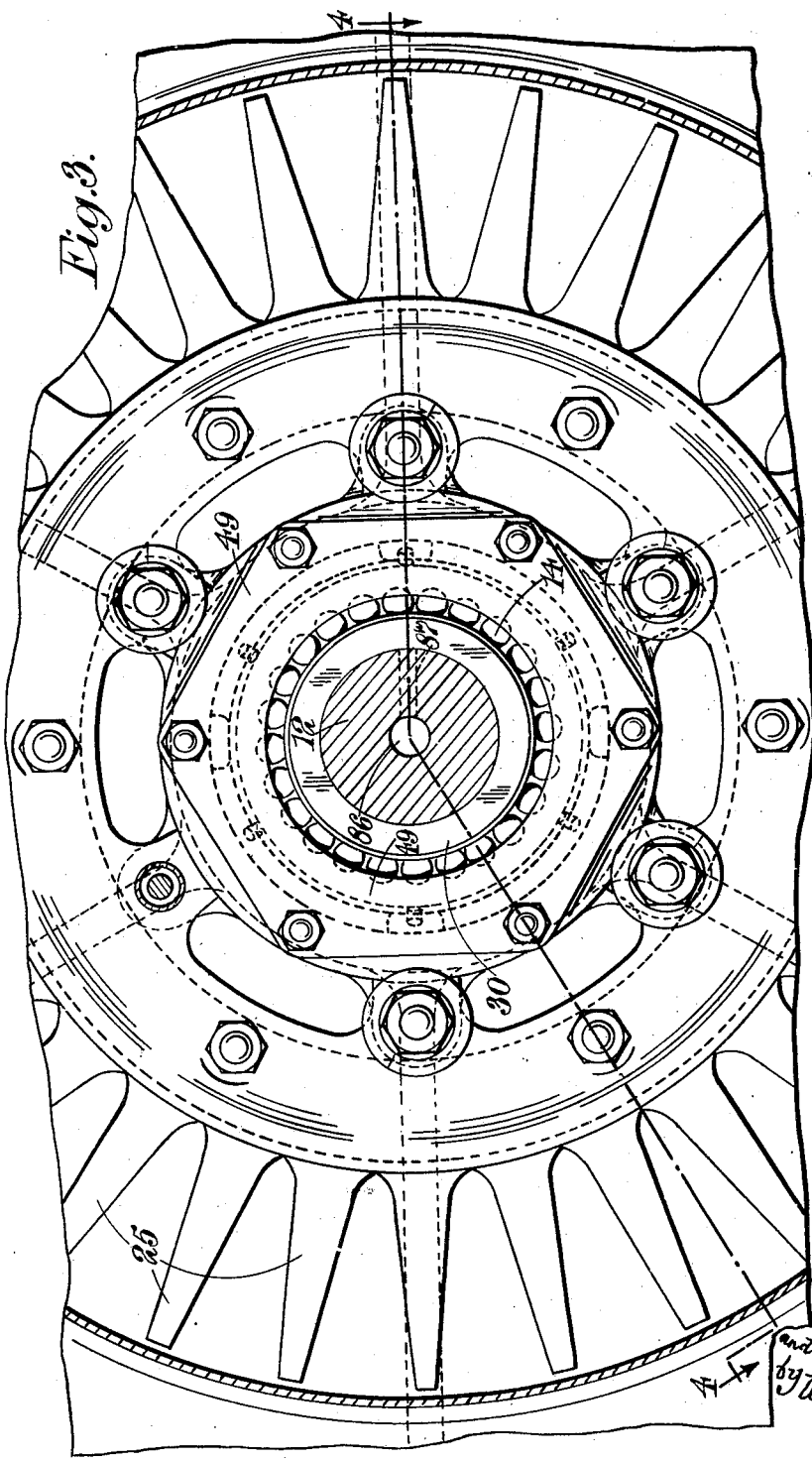
Figure 4:
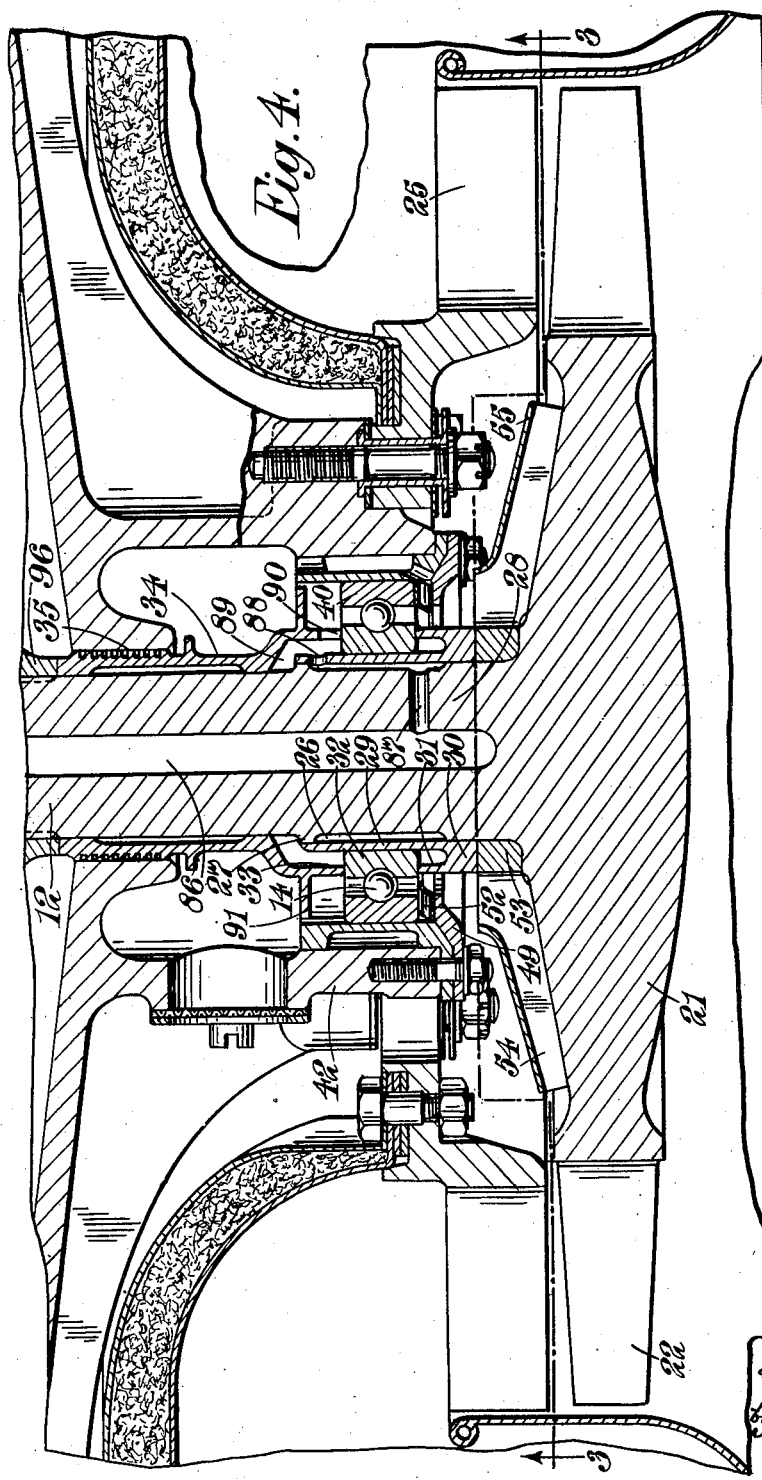
Figure 5:
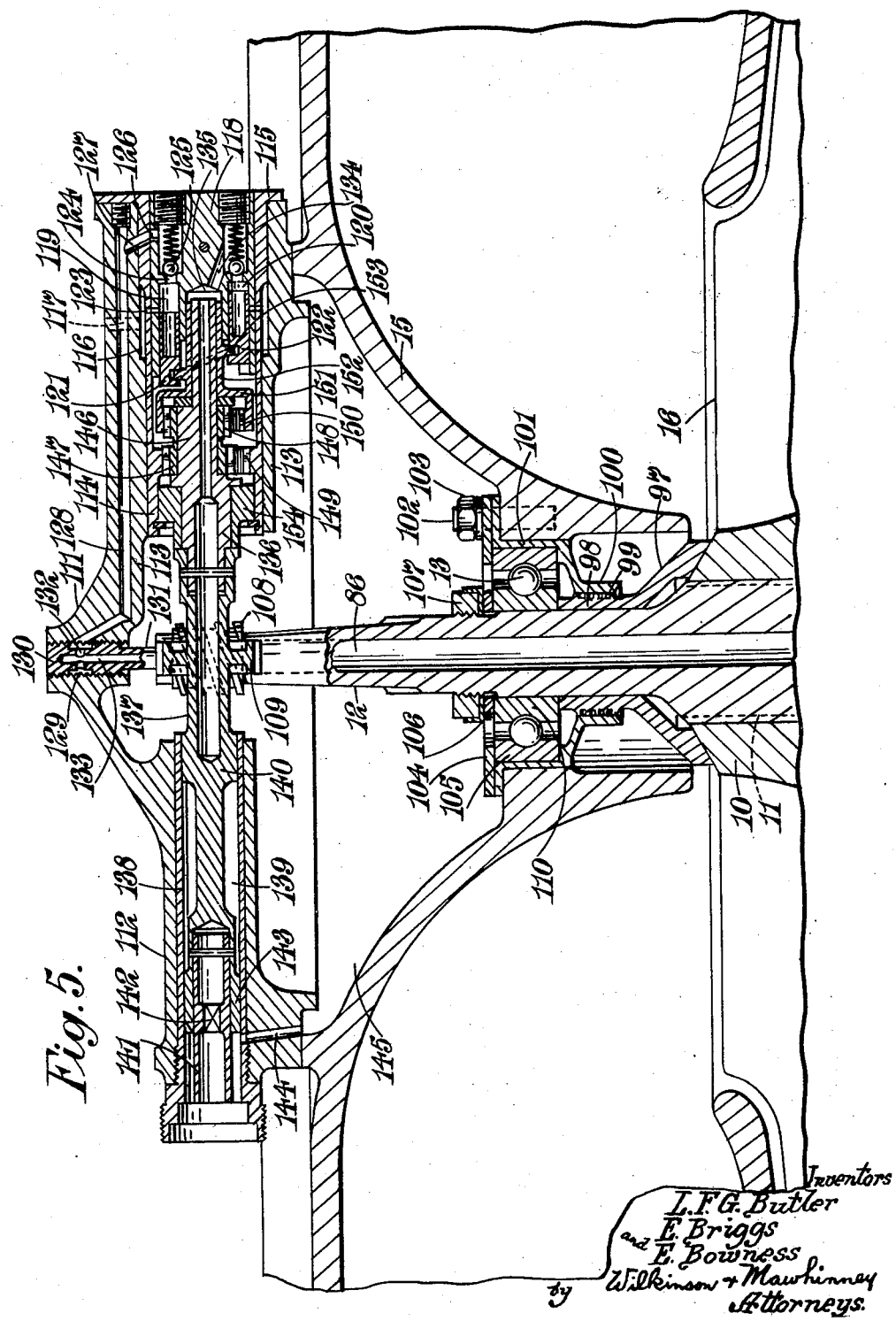

In the accompanying drawings which illustrate one embodiment of this invention,

Figure 1 is a sectional elevation of the complete supercharging unit, being a section on the line 1—1 of Figure 2, Figure 2 is an under-plan view of Figure 1, Figure 3 is a partial view similar to Figure 2 but drawn to an enlarged scale, being a section on the line 3—3 of Figure 4, Figure 4 is a part-sectional elevation similar to Figure 1, being mainly a section on the line 4—4 of Figure 3, and Figure 5 is a sectional elevation to the same scale as Figure 4 showing the detail construction of the lubricating pumps.

Like reference characters indicate like parts throughout the drawings.

The general arrangement of the supercharger unit is shown in Figures 1 and 2. The impeller 10 of a centrifugal blower of known or usual construction is mounted by its splines 11, and by other means described below, on a shaft 12 which rotates in an upper bearing 13 (see Figure 5) in a housing 101 and a bottom bearing 14 (see Figure 4). The upper bearing 13 is supported in the wall 15 of the chamber through which air, or a mixture of fuel and air, is admitted to the eye 16 of the impeller. The air enters the chamber by an inlet 17 (Figure 2) and is discharged by the impeller 10 through the usual fixed diffuser vanes 18 into a volute chamber 19 from which it is delivered by the outlet 20 to the induction system of the internal-combustion engine to which this supercharger unit is applied. The compressed air may be discharged directly to the induction system of the engine, or to a carburetor from which the mixture of fuel and air is delivered to a second-stage blower which delivers the compressed mixture to the induction system of the engine. The compressor herein described is therefore preferably a first-stage compressor in a two-stage system, but the invention is not limited to this arrangement.

The lower end of the shaft 12 is formed integrally with a turbine-rotor 21 having blades 22 through which the exhaust gases from the internal-combustion engine flow, these gases being admitted by a pipe 23 to a scroll-shaped chamber 24 from which they are discharged downwardly through the usual fixed guide-vanes 25 to the blades 22. On leaving the blades 22 the gases may be conducted away by an exhaust pipe, or alternatively may simply be discharged into the external airstream flowing along the underside of an aircraft fuselage or wing when this unit is used with an aero engine.

The detailed construction and arrangement of the mounting for the bearing 14 is described in our British patent application No. 2,136/39 (United States Serial No. 319,950, filed February 20, 1940) and for the purposes of the present invention it is only necessary to point out that the shaft 12 is provided near the bearing with a recess or groove 26 bounded at its upper end by a narrow flange 27 on the shaft and at its lower end by an unreduced portion 28 of the shaft. This groove 26 is surrounded by a thin steel sleeve 29, the bottom end of which is thickened at 30 and provided with an upstanding portion 31 to engage the lower side of the inner race 32 of the ball bearing 14. The upper face of this race is engaged by the tubular part 33 of a sleeve 34 surrounding the shaft and provided with an oil seal 35. The shaft 12 is bored from its upper end at 86 and provided with a transverse opening 87 whereby the bore 86 communicates with the space 26 between the bearing and the shaft.

The outer race 40 of the bearing 14 is supported by a waved springy washer 52 from a plate 49 which has a central aperture around the sleeve 29.

A centrifugal fan having a hub 53 and blades 54 is mounted on the part 28 of the shaft 12 adjacent the rotor 21 of the turbine; this fan is used, as described in our British patent application No. 2,136/39 for inducing the flow of air around the bearing to cool it, but it also serves to discharge oil which, according to this invention, assists in cooling the bearing 14, the discharge taking place radially into the exhaust gases passing through the turbine blades.

Lubricating oil is supplied as hereinafter described to the central bore 86 of the shaft 12 and passes out through the radial passage 87 to the groove 26 and thence through a port 88 in the sleeve 29 into a space 89 adjacent the inner race 32 of the bearing 14. From the space 89 the oil passes through one or more ports 90 in the sleeve 33 into the space 91 immediately above the bearing so that it can then pass downwards through the bearing and out from the central hole in the plate 49, finally being expelled by the centrifugal fan 54 as above described. This flow of oil in addition to lubricating the bearing plays an important part in cooling it, and is preferably used in conjunction with the air cooling described in British patent application No. 2,136/39.

The impeller 10 of the compressor, as stated above, is mounted on the shaft 12 by splines 11 and it is further provided with a cone-shaped plate 96 (see Figure 1) on its underside and a similar oppositely directed cone-shaped plate 97 on its upper side (see also Figure 5). This plate 97 is formed with a sleeve portion 98 grooved at 99 to form a packing between the sleeve and a downward extension 100 from the ring or casing 101 which is attached to the wall 15 of the inlet volute by studs and nuts 102, 103. These studs also locate an annular plate 104 between which and an internal shoulder at the bottom of the ring 101 the outer race 105 of the bearing 13 is mounted. The inner race 110 of the bearing is engaged at its lower end by the upper end of the member 97, and at the top by a washer 106 held in place by a nut 107 screw-threaded on to the shaft 12.

Near its upper end the shaft 12 carries a worm 108 whereby a drive is imparted as hereinafter described to the lubricating pumps for this supercharger unit.

The parts so far described of this supercharger unit are assembled in the following manner. The bearing 14 is assembled in its casing on the underside of the wall of the blower, and the sleeve 34 is also inserted in place. The fan hub 53 and the sleeve 29, 30 are slid on to the shaft 12 from its upper end and the shaft is then introduced through the bearing until it occupies the position shown in the drawings. The cone-shaped plate 96 is next threaded on to the shaft, then the impeller 10 and then the cone-shaped plate 97. The casing 101 is next placed in position with the upper part of the blower casing and the bearing is clamped in place by the washer 106 and nut 107, and then the plate 104 is secured to the wall 15 of the blower. When the nut 107 is tightened up the inner race 110, the sleeve 98 and plate 97, the impeller hub and the plate 96 are all clamped between the nut 107 and the turbine-rotor disc 21.

The oil pumps for the lubrication of the bearings and cooling of the lower turbine bearing 14 are mounted in a conical closure plate 111 secured on top of the blower casing as shown in Figure 1. This plate 111 is formed at one side with a tubular enlargement 112 and at the other side with an enlargement 113 in which the pumps are accommodated. The enlargement 113 is engaged internally by a sleeve 114 of which the outer end is flanged at 115, the flange being affixed to the plate 111 by suitable bolts (not shown). Between the sleeve 114 and the surrounding wall of the part 113 an annular space 116 is formed into which a conduit 117 leads from a reservoir (not shown) of lubricating oil. The end of the sleeve 114 is engaged by a cylinder-block 118 which is cut with two cylindrical recesses 119, 120 to accommodate pistons 121, 122, respectively. The cylinder 119 and the surrounding sleeve 114 are cut with a conduit 123 to form an inlet port from the groove 116 to the interior of the cylinder. This port is controlled by the piston 121 in a manner described below. The delivery port 124 of the cylinder 119 is controlled by a spring-pressed ball-valve 125 of which the valve-chest communicates through a port 126 and a conduit 127 in the sleeve 114 and casing 113 with a conduit 128 in the casing. This conduit leads to a groove 129 in a plug 130 which closes the top of the conical casing 111 and with which a stem 131 is integrally formed and leads down into the interior of the shaft 12. Radial ports 132 connect the groove 129 with the bore 133 of the stem. Thus the delivery of the pump-cylinder 119 is supplied to the interior of the shaft 12.

The other cylinder is equipped with a similar delivery port and ball-valve the valve-chest of which is connected by a conduit 134 to a central space 135 in the cylinder block 118. From this space the oil is delivered along the interior of a shaft 136 which is cross-pinned to the shaft 137 with which the worm-wheel 109 is integrally formed. The shaft 137 where it enters the sleeve 138 which lines the enlargement 112 is formed with a groove 139 which is connected by a port 140 with the interior of the right-hand end of the shaft. At its left-hand end the shaft 137 is cross-pinned to a shaft 141 having a non-circular portion 142 for engagement with the end of a flexible shaft from which a tachometer is driven to indicate the rate of revolution of the turbo-compressor shaft. Oil from the space 139 lubricates the bearing between an enlarged portion 143 of the shaft 137 and the surrounding sleeve 138 and, having passed beyond this portion, escapes through a conduit 144 in the casing 111 into the cup-shaped chamber 145 formed by the central portion of the compressor casing 15.

The shaft 137 is formed with an eccentric portion 146 which constitutes an axle for a compound planetary pinion comprising gears 147 and 148. The gear 147 meshes with a fixed internal gear 149 cut on the inside wall of the sleeve 114. The gear 148 meshes with an internal gear 150 cut on a cup-shaped member 151 carried by a short shaft 152. The shaft 152 is formed integrally with a face cam 153 which engages simultaneously with notches in the pistons 121, 122 whereby, upon rotation of the cam, the pistons are reciprocated in their cylinders. The shaft 152 is borne in the central recess 135 in the cylinder block and the shaft 136 is borne at its right-hand end in the shaft 152 and at its left-hand end in a bush 154 in the inner end of the sleeve 114.

As the piston 121, for example, is moved to the left as seen in Figure 5 the ball 125 closes and a vacuum is produced in the cylinder 119 until the port 123 is uncovered. Thereupon oil from the space 116 flows into the cylinder and on the succeeding stroke to the right this oil is supplied through the delivery port 124 in the manner already explained. The pump 122 operates in the same manner.

It will be understood that the shaft 12 rotates at a high speed and the gearing 108, 109 and the epicyclic gearing 146, 147, 148, 149, 150 ensures that the pump-plungers 121, 122 are driven at a suitably reduced speed.

The oil which enters the space 145 through the port 144 flows downwardly through the bearing 13 and lubricates the balls, escapes slowly through the packing 99, 100, and is discharged by centrifugal force from the bottom edge of the cone-shaped plate 97. At this point the oil enters the stream of air flowing into the eye 16 of the impeller.

The cooling of the bearing 14 by the circulation of lubricating oil is preferably additional to the air cooling described in British patent application No. 2,136/39 and to the construction whereby the bearing is insulated from heat as described in British patent application No. 11,452/40, so that the complete system ensures that the oil is not disintegrated by excessive heat but merely assists in the cooling of the bearing.

It will be seen that this invention provides a complete supercharger unit in which the arrangement whereby the lubricating oil pumps are driven by the turbine shaft ensures that a metered supply of oil is given to the bearing at a rate dependent upon their requirements and independently of the general lubricating system of the engine wherewith this supercharger is used.

We claim:

1. A turbo-compressor for a super-charged internal-combustion engine, comprising a turbine rotor and a supercharging impeller mounted on the same shaft, epicyclic gearing driven by said shaft, a swash-plate or face cam driven by said epicyclic gearing and pumps driven by said swash-plate or face cam to supply lubricant to the shaft bearings.

2. In combination, a turbine, a turbine shaft extending up from said turbine substantially vertically, a compressor in driven connection with said shaft spaced above the turbine, a lower bearing for said shaft between the turbine and compressor, an upper bearing for the shaft above the compressor, lubricant pumps above said upper bearing in communication with a source of lubricant supply, gearing driven by said shaft, cam means driven by said gearing and driving said pumps, means between one pump and said upper bearing for the delivery of lubricant from said pump to said upper bearing, means establishing communication between the other lubricant pump and said lower bearing.

3. A turbo-compressor for a super-charged internal combustion engine comprising a turbine rotor and a super-charging impeller mounted on the same shaft, gearing driven by said shaft, a cam driven by said gearing, and pump means driven by said cam to supply lubricant to the shaft bearings.

LEONARD FREDERICK GEORGE BUTLER.
ERNEST BRIGGS.
EDWARD BOWNESS.